United States Patent [19]

Busacca

[11] Patent Number: 4,517,166
[45] Date of Patent: May 14, 1985

[54] TWO-STAGE CHLORINATION PROCESS FOR THE PRODUCTION OF SOLID BLEACHING POWDER WITH A HIGH ACTIVE CHLORINE CONTENT

[75] Inventor: Giuseppe Busacca, Milan, Italy
[73] Assignee: Consito SpA, Milan, Italy
[21] Appl. No.: 619,753
[22] Filed: Jun. 12, 1984
[51] Int. Cl.$^3$ ............................................ C01B 11/06
[52] U.S. Cl. ................. 423/474; 252/187.28; 252/187.30
[58] Field of Search ............ 423/474; 252/187.28, 252/187.3

[56] References Cited

U.S. PATENT DOCUMENTS

| 1,713,669 | 5/1929 | MacMullin et al. | 423/474 |
| 4,468,377 | 8/1984 | Sakowski et al. | 423/474 |

FOREIGN PATENT DOCUMENTS

| 167103 | 12/1980 | Japan | 423/474 |

Primary Examiner—John Doll
Assistant Examiner—Jeffrey E. Russel
Attorney, Agent, or Firm—Sughrue, Mion, Zinn, Macpeak, and Seas

[57] ABSTRACT

The subject of the invention is a two-stage process for the production of bleaching powder with a high active chlorine content, which comprises suspending slaked lime in the aqueous solution resulting from the second chlorination stage after the separation of the solid formed therein, passing chlorine gas into the suspension at 35°–45° C. until the lime content of the suspension has been reduced to between 40% and 55% by weight of the initial content, separating the mother liquor from the solid obtained, suspending the solid in water in a ratio of from 1 to 1.5 parts of water per part of solid, bringing the pH of the suspension obtained to between 13 and 14 with an aqueous sodium hydroxide solution, passing gaseous chlorine into the suspension at a temperature of about 10 C. degrees below that of the first chlorination stage, continuing the passage of chlorine until the pH of the suspension has fallen to between 10 and 9, separating the solid from the mother liquor, which is recycled, washing the solid with water and drying the washed product at a temperature below 80° C. until it has a residual water content of less than 10% by weight, thus obtaining bleaching powder with an active chlorine content of more than 70%.

5 Claims, No Drawings

TWO-STAGE CHLORINATION PROCESS FOR THE PRODUCTION OF SOLID BLEACHING POWDER WITH A HIGH ACTIVE CHLORINE CONTENT

The present invention relates to a two-stage process for the production of a stable, solid bleaching powder which has an active chlorine content above 70%.

The term "active chlorine content" of a bleaching powder means the quantity by weight of chlorine which is evolved on treatment of the bleaching powder with aqueous hydrochloric acid, according to the reaction $$Ca(ClO)_2 + 4HCl = CaCl_2 + 2H_2O + 2Cl_2$$

The capacity of bleaching powder to liberate chlorine depends on its content of calcium hypochlorite, a solid which is very soluble in water and decomposes even at ambient temperatures to liberate chlorine.

Pure calcium hypochlorite has an active chlorine content of 99.3%.

A product in commercial use which is formed by the chlorination of lime, and which is precisely bleaching powder, has an active chlorine content of between 35% and 39%.

Bleaching powders with higher active chlorine contents, above 60% of active chlorine, have also been introduced commercially and are termed bleaching powders with high activities.

The present invention relates to a process for the manufacture of bleaching powder with a high activity, more particularly bleaching powder with an active chlorine content above 70%.

The capacity of bleaching powder to liberate chlorine easily when dissolved in water has resulted in its wide-spread commercial use as a bleach for cellulose, paper and textiles and also as an antiseptic.

Naturally the products with higher active chlorine contents are those which are in greatest demand since, for a given weight, they allow greater quantities of active chlorine to be transported than products with low activities, thus reducing transport costs considerably.

Furthermore, products with high activities are more stable and less sensitive to moisture than products with low activities and hence can be stored for longer periods of time and can be transported more easily.

The facility with which the calcium hypochlorite decomposes in water is the main obstacle which prevents bleaching powders being made with high active chlorine contents.

During the chlorination of the lime, other products in fact form, such as the chloride, chlorite and chlorate of calcium which are unwanted impurities which lower the active chlorine content (that is the calcium hypochlorite content) of the final product.

In most industrial processes for the chlorination of lime, one is content to achieve active chlorine contents of from 35% to 39%, the chlorination being carried out in a single stage, possibly in the absence of water, as proposed, for example, in Italian Patent Application No. 28441-A/76.

In order to obtain bleaching powders with high active chlorine contents, that is, more than 60% by weight of active chlorine, recourse has been made in the art to multi-stage chlorination processes and to the use of sodium hydroxide to increase the quantity of calcium hypochlorite in the mixture by reaction between the sodium hypochlorite and the calcium chloride by-product.

These processes however present several disadvantages in practice, such as, for example, the difficulty of filtering the solids when the active chlorine content is above 35% by weight, and also involve a high consumption of sodium hydroxide.

It has now been found, and this constitutes the main subject of the present invention, that it is possible to make bleaching powder with an active chlorine content above 70% by chlorinating a suspension of slaked lime in an aqueous medium with gaseous chlorine, provided that the chlorination is carried out in two stages, in the first of which the conversion of the slaked lime is not taken beyond 55% of that loaded in originally, while the conversion is completed in the second stage.

It is essential that the two chlorination stages be carried out under very tightly controlled conditions both with regard to the temperature and the acidity (pH) of the medium and the feed rate of the chlorine, as will be specified more precisely below.

The chemistry of the process is very complicated in that the process is carried out in a system including very reactive compounds in the presence of three heterogeneous phases: gaseous chlorine, the aqueous liquid medium which keeps many of the components of the system in solution, and a solid phase constituted by mixed products of the crystallisation of various of the chemical species present, in particular calcium hypochlorite with calcium chloride and calcium hydroxide in various proportions to each other, and which crystallise with a variable number of molecules of water of crystallisation.

The composition of the system is thus strongly influenced by the operational parameters and, basically, in order to obtain bleaching powder with a high activity according to the present invention, the various parameters are combined as described below.

According to one fundamental characteristic of the invention, the aqueous medium used for suspending the slaked lime to be conveyed into the first chlorination stage is constituted by the mother liquor resulting from the separation of the solid after the second chlorination stage.

This mother liquor also contains calcium chlorate, (as well as calcium chloride and other products) which, under the chlorination conditions in the first stage, reacts in substantial quantities with the calcium chloride, thus allowing a considerable increase in the overall conversion of the chlorine and the calcium hydroxide initially fed in, at the expense of two of the main by-products.

According to another characteristic of the invention, the mother liquor resulting from the separation of the solid after the first chlorination stage is, to advantage, mixed with the waste and washing waters from the other stages of the process, thus giving an aqueous solution which contains from 3% to 5% of calcium hypochlorite. This solution is sold as a bleach for domestic use (bleach).

Thus no pollutants are discharged from any point in the plant for the production of bleaching powder with a high activity according to the present invention.

In the process according to the present invention, the pH values of the suspensions never fall below 9, this value being ensured in the first chlorination stage by the unreacted calcium hydroxide while, in the second stage, before the chlorine is introduced, a 20% to 40% by weight aqueous caustic soda solution is added to the suspension in a quantity such as to bring the pH of the suspension to between 13 and 14.

The qauntity of sodium hydroxide needed is, however, less than 10 parts by weight per 100 parts of the final product with an active chlorine content above 70% by weight.

In a preferred embodiment, the two-stage chlorination process for the production of bleaching powder which is the subject of the present invention is characterised by (a) suspending slaked lime with a calcium hydroxide content above 95% in an aqueous medium constituted by the mother liquor resulting from the liquid/solid separation of the reaction products from the second chlorination stage, with a weight ratio of the lime to the aqueous medium of between 1:2 and 1:2.5;

(b) passing gaseous chlorine into the suspension thus obtained and, agitation being maintained, adjusting the rate of immission of the chlorine to between 5 and 10 kg/h per 100 kg of calcium hydroxide present in the suspension, keeping the temperature at between 35° and 45° C., and stopping the immission of chlorine when more than 40% but less than 55% of the calcium hydroxide originally loaded in is still present in the suspension;

(c) separating the solid from the suspension by filtration or centrifuging and re-suspending the solid in water with a weight ratio of the solid to the water of between 1:1 and 1.5:1;

(d) adding to the suspension such as quantity of aqueous sodium hydroxide solution having a concentration of from 20% to 40% by weight as to bring the pH of the suspension to between 12 and 14;

(e) conducting a second chlorination stage by passing gaseous chlorine into the suspension at a rate of from 1.5 to 2 times the rate used in the first chlorination stage and keeping the temperature of the suspension at about 10° C. degrees below that of the first chlorination stage, continuing the introduction of chlorine until the quantity of calcium hydroxide in the suspension is reduced to less than 0.2 parts by weight per 100 parts by weight of suspension, (f) separating the solid from the suspension by filtration or centrifuging, washing the solid with about ⅓ its weight of water and drying the washed product with hot air at a temperature no higher than 80° C. until the residual moisture content of the dried solid is reduced to between 5% and 10% by weight.

In order better to illustrate the invention, but without wishing to limit it in any way, an example of application is given below.

EXAMPLE 74 g of solid calcium hydroxide and 178 g of an aqueous solution obtained in a prior process for the preparation of bleaching powder with a high active chlorine content were loaded into a laboratory, 1 liter, glass reactor fitted with a bladed agitator, a thermostatically controlled bath, a rotameter and a chlorine inlet tube dipping into the liquid and a gas outlet tube with a caustic soda trap.

The aqueous solution contained the following compounds: 5.4% calcium hypochlorite, 15.8% calcium chloride, 4.8% calcium chlorate, all the percentages being expressed by weight per 100 parts of solution. The pH of the suspension was 12.9.

The temperature of the solution was brought to 40° C. by means of the thermostatically controlled bath and then the immission of chlorine was started, the flow being regulated to 2.2Nl/h.

The immission of chlorine was continued for 5.5 hours. The temperature of the solution was kept constant at 40° C. for the whole chlorination time by means of the thermostatically controlled bath.

The total quantity of chlorine fed in at the end of the chlorination was 39 g. The pH of the suspension at the end of the operation was 9.3.

The reaction product obtained was then filtered through a Buchner filter under vacuum thermostatically controlled to 40° C.

The filtered residue was analysed and found to contain 19.5% calcium hydroxide, 14.4% calcium chloride, 30.7% calcium hypochlorite, with a solid content of 65%, all the percentages being by weight per hundred parts of the filtered solid as a whole.

Non-quantifiable traces of calcium chlorate were also found. The mother liquor contained 3.8% calcium hypochlorite, 3.5% calcium chlorate and 23% calcium chloride.

164 g of the residue from the treatment described above were returned to the reactor previously used for the first part of this example together with 170 ml of water; 12 g of an aqueous 30% by weight caustic soda solution were then added to the suspension, kept under agitation, to bring the pH of the suspension to 13.9.

The thermostatically controlled bath was then adjusted to bring the temperature of the suspension to 30° C. and gaseous chlorine was then passed in at a rate of 3.3Nl/h. The immission of chlorine was continued for three hours, the temperature of the suspension always being kept at 30° C.

The total quantity of chlorine fed in at the end of the chlorination was 31.5 g. The pH of the suspension at the end of the operation was 9.3 and the calcium hydroxide content was 0.15 parts per 100 parts of suspension.

The suspension was then removed from the reactor and filtered under vacuum through a Buchner filter, thermostatically controlled to 30° C.

The filtered solid weighed 141 g while the mother liquor collected weighed 235 g.

The filtered solid was analysed and found to contain 0.45% calcium hydroxide, 32.8% calcium hypochlorite and 14% calcium chloride, all the percentages being expressed by weight per hundred parts of the total filtered solid. Traces of calcium chlorate were present.

120 g of the filtered solid were washed on a filter with 25 ml of water and then dried at 65° C. under vacuum until the water content of the product was reduced to 10%.

The product thus dried weighed 60 g and had a calcium hypochlorite content of 76% and an active chlorine content of 75.5%.

The mother liquor was analysed and found to have the following values: 5.5% calcium hypochlorite, 16% calcium chloride, 4.5% calcium chlorate, all the percentages being expressed by weight per hundred parts of solution.

What is claimed is:

1. Two-stage chlorination process for the production of bleaching powder with a high chlorine content characterised by (a) suspending slaked lime with a calcium hydroxide content above 95% in an aqueous medium constituted by the mother liquor resulting from the liquid/solid separation of the reaction product from the second chlorination stage, with a weight ratio of the lime to the aqueous medium of between 1:2 and 1:2.5;

(b) passing gaseous chlorine into the suspension thus obtained and, agitation being maintained, adjusting the rate of immission of the chlorine to between 5 and 10 kg/h per 100 kg of calcium hydroxide present in the suspension, keeping the temperature at between 35° and 45° C., and stopping the immission of chlorine when more than 40% but less than 55% of the calcium hydroxide originally loaded in is still present in the suspension;

(c) separating the solid from the suspension by filtration or centrifuging and re-suspending the solid in water, with a weight ratio of the solid to the water of between 1:1 and 1.5:1;

(d) adding to the suspension a quantity of aqueous sodium hydroxide solution having a concentration of from 20% to 40% such as to bring the pH of the suspension to between 12 and 14;

(e) conducting a second chlorination stage by passing gaseous chlorine into the suspension at a rate of from 1.5 to 2 times the rate used in the first chlorination stage and keeping the temperature of the suspension at about 10 C. degrees below that of the first chlorination stage, continuing the immission of chlorine until the quantity of calcium hydroxide in the suspension is reduced to less than 0.2 parts by weight per 100 parts by weight of suspension;

(f) separating the solid from the suspension, by filtration or centrifuging, washing the solid residue with about ⅓ its weight of water and drying the washed product with hot air or under vacuum at a temperature no higher than 80° C. until the residual moisture content of the dried solid is reduced to between 5% and 10% by weight.

2. Process in accordance with claim 1, characterised by the mixing of the mother liquor resulting from the separation of the solid from the first chlorination stage with the water used for washing the solid obtained in the second chlorination stage and with part of the mother liquor obtained from the separation of the solid from the suspension resulting from the second chlorination stage, the quantities of these parts being adjusted so as to give an aqueous solution having a calcium hypochlorite content of from 3% to 5% by weight.

3. Process in accordance with claim 1, characterised in that the temperature in the first chlorination stage is kept between 38° and 42° C. and in the second chlorination stage is kept between 28° and 32° C.

4. Process in accordance with claim 1, characterised in that the pH of the suspension in both the first and the second chlorination stages never falls below 9.

5. Process in accordance with claim 1, characterised in that the calcium chlorate present in the mother liquor used for suspending the slaked lime to be subjected to the first chlorination stage reacts in substantial quantities with the calcium chloride present in the suspension during the first chlorination stage, forming calcium hypochlorite.

* * * * *